United States Patent [19]
Fujiwara

[11] 3,776,255
[45] Dec. 4, 1973

[54] AIR VENT

[76] Inventor: Yoshiyasu Fujiwara, No. 191 Nishitani, Kakogawa, Japan

[22] Filed: Aug. 9, 1971

[21] Appl. No.: 169,916

[30] Foreign Application Priority Data
Feb. 13, 1971 Japan.................................. 46/7902
Apr. 2, 1971 Japan............................... 46/24215

[52] U.S. Cl.................. 137/202, 137/390, 137/433
[51] Int. Cl............................................ F16k 45/02
[58] Field of Search................... 137/192, 202, 390, 137/433; 251/335 B, 322, 323

[56] References Cited
UNITED STATES PATENTS
| | | | |
|---|---|---|---|
| 206,748 | 8/1878 | Pascall | 137/181 |
| 3,489,164 | 1/1970 | Fujiwara | 137/192 |
| 1,648,047 | 11/1927 | Giesler | 137/202 X |
| 2,528,822 | 11/1950 | Dunn | 251/323 X |
| 1,374,571 | 4/1921 | Hummel | 251/355 B X |
| 2,326,487 | 8/1943 | Overbeke | 251/322 |

FOREIGN PATENTS OR APPLICATIONS
| | | | |
|---|---|---|---|
| 274,633 | 7/1927 | Great Britain | 137/202 |
| 808,934 | 7/1951 | Germany | 137/202 |

Primary Examiner—Alan Cohan
Assistant Examiner—Gerald A. Michalsky
Attorney—David Toren et al.

[57] ABSTRACT

An improvement of the float type air vent, which is used as air vent valve for cold water, hot water and the like. The improvement resides particularly in the points that it is formed into small size and simple make and may be used without requiring any regulation in a wide range from very low pressure to high pressure, assuring a reliable working and low cost, thus assembling and overhauling and the like may be simplified.

6 Claims, 4 Drawing Figures

INVENTOR
YOSHIYASU FUJIWARA
BY Toren and McGeady
ATTORNEYS

AIR VENT

BACKGROUND OF THE DISCLOSURE

Generally, an air vent is attached to projecting portions of cold water or hot water piping and the like for the purpose of automatically exhausting air, which is accumulated at said portions. Particularly, when the air vent is used as an air vent valve for a small type cooler and heater, such conditions are required that it must be a small-type, especially small in its height, in view of the position for attachment, and it must be available without any regulation in a wide range of 0 to 16 $kg/cm^2$ with the development of higher building and the working thereof must be accurate, without any trouble, with low cost of production and easy handling.

Usually, since this type of air vent has an exhaust port on its top portion and the valve body is connected with a float or a bucket, and a larger float compared with the valve port is needed, so that the shape of whole body becomes larger and cannot be easily received within a small type cooler and heater, and because of the small valve port, must much is required for air exhaust at the time of starting, further because of sealing being made at the same portion of valve body in this kind of air vent, considerable wear will be caused locally and working pressure thereof cannot be available as low as about 1 $kg/cm^2$ only, besides it is of narrow use and of no practical use, having very short life-time.

SUMMARY OF THE INVENTION

This invention relates to an improvement of the air vent, wherein above mentioned defects are eliminated in compliance with above mentioned requirements.

According to the present invention, an air vent is so cnstructed that a float itself is used directly as a valve body, a valve port is provided on upper portion of side wall of the main body, and on top portion of the valve body, there is provided a manual operating rod, which can push down said float from outside and forcibly open the valve, wherein two semi-spherical shells having different thickness are seamed to obtain a small type float for use, and the seamed portion thereof is always kept parallel to the water level, so that said seamed portion would never confront with the valve port, because the valve port is provided on the upper portion, thus the float may be used without finishing its seamed portion.

And, because the valve port is provided on the upper portion of side wall, vertical component of the valve closing force acting on the valve port is considerably small compared with the case when the valve port is provided on the top portion, so that a valve port having larger aperture may be opened by means of a small-type float. And, the tip of said operating rod serves also for a seat of the float, so that the dimension of said operating rod was in need of high accuracy particularly, and production thereof was very difficult as well as production cost thereof was usually high, because the float became impossible to close perfectly the valve port provided on the side wall of the main body, depending on the accuracy of dimension of said operating rod.

Accordingly, in the present invention, the operating rod is so provided that a pertinent position of the float seat may be adjusted, thus lowering production costs thereof and assuring perfect action of valve closing.

DESCRIPTION OF THE PREFERRED EMBODIMENTS

Figure 1:
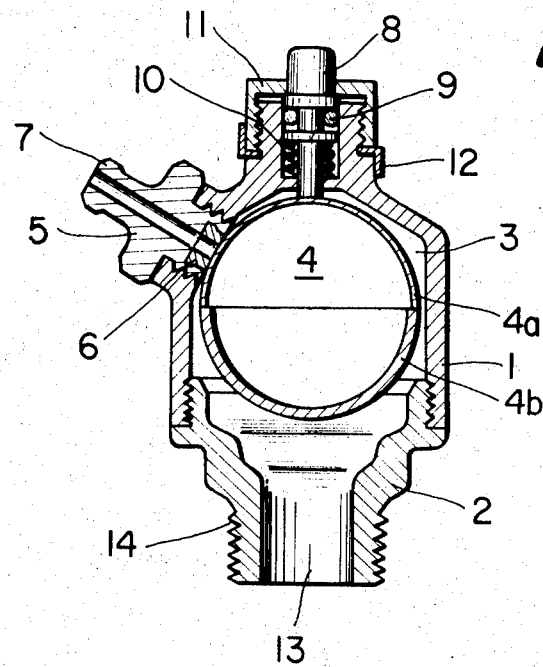
FIG. 1 is a longitudinal section showing an embodiment of the present invention.

In FIG. 1, 1 denotes a main body of an air vent according to the present invention, 2 a bottom member thereof and a hollow chamber 3 is formed by said two parts. In said hollow chamber 3, a float 4 is housed in free state, which float is formed by seaming two semi-spherical shells 4a, 4b having different thickness. A valve seat member 5 is attached on upper portion of the side wall of said main body 1. On said valve seat member 5, a valve seat 6 is attached and a connecting portion 7 to the discharge side is further provided. And, on the top portion of said main body 1, a manually operating rod 8 is provided in such a manner that the rod is energized upwardly by a spring 10 through O-ring 9 and lower tip of the rod protrudes within said hollow chamber 3, and a cap 11 is screwed up so that upper end of said operation rod 8 will be exposed outside. It is so arranged that an exact position of the float seat may be set up by sliding the operating rod 8 up and down. After setting up the adjustment, the cap 11 is checked from turning by using a lock washer 12, of which one end is bent towards the main body 1 and another end is bent towards the cap 11. And, said bottom member 2 is provided with an inlet 13 and a connecting screw 14 to an inlet side.

In the next place, the working of this embodiment will be explained, as follows.

Firstly, when the hollow chamber 3 is filled up with liquid, the float 4 will float up to the float seat position of the tip of operating rod 8 and will be pressed on the valve seat 6 by the pressure on the inlet side. Under this state, the cap 11 is adjusted to set up exactly the position of the float seat of the tip of operating rod 8, and by means of the lock washer 12, the turning of the cap from the main body 1 is checked, thus the float 4 can completely block the valve port and the state of closed valve will be maintained.

Next, when the air enters into the chamber 3 from the inlet 13 and accumulates beyond its predetermined position, the float 4 will decrease its buoyance and empty weight of the float 4 will overcome the vertical component of valve closing force due to the inlet pressure acting on said valve port to open the valve for exhausting the air. And, when the air is exhausted, the float 4 will refloat to close the valve and thereafter same operations are repeated to exhaust the air.

Figure 2:
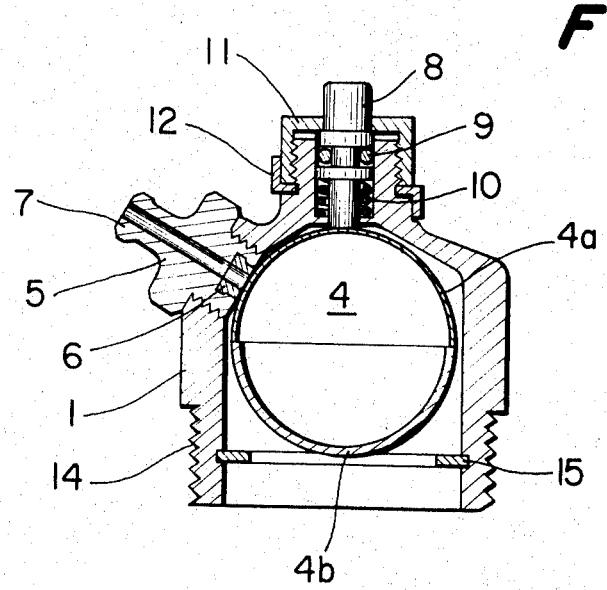
FIG. 2, FIG. 3 and FIG. 4 are longitudinal sections showing other embodiments of the present invention.
Figure 3:
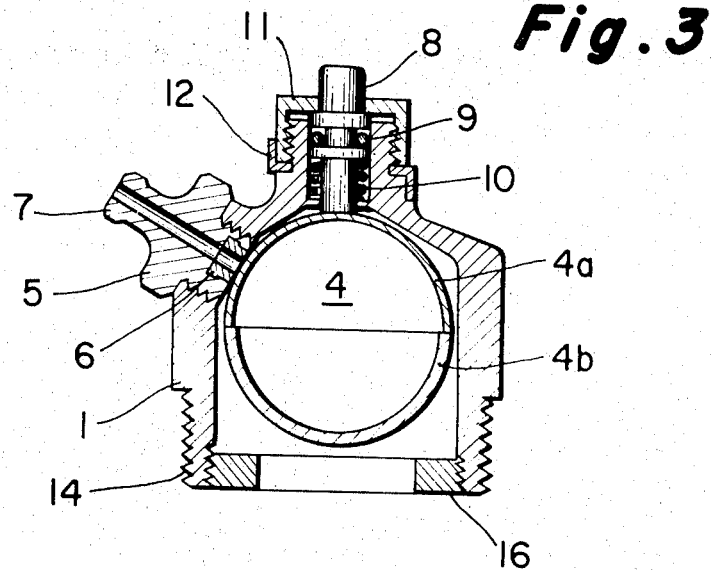

As shown in FIG. 2 and FIG. 3, lower portion of the main body is provided with thread for direct connection and instead of the bottom member 2 of said embodiment, a snap ring 15 or an annular member 16 is attached for preventing the float 4 from slipping out of the main body, thus whole height of the air vent becomes very low.

Figure 4:
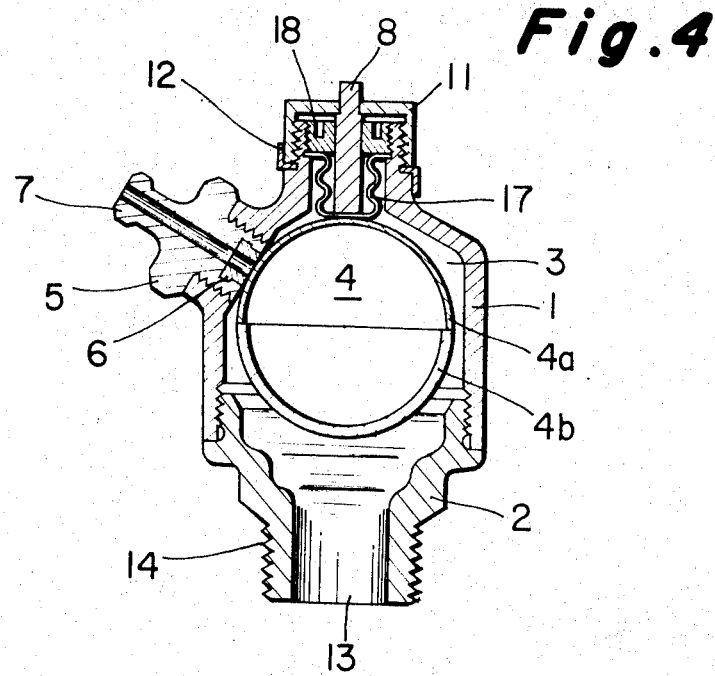

And, when the sealing of slidable portion of the operating rod 8 of said embodiments is made by means of a bellows 17 as shown in the embodiment of FIG. 4, said sealing will attain perfection and the air vent can be used as well for high pressure. 18 denotes a clamp member.

Further, in said embodiments, the float 4 is formed in such a manner that two semi-spherical shells having different thickness are seamed together, however, when a float, which is formed by seaming together two semi-spherical shells having equal thickness and at the central portion of one of semi-spherical shells a weight being provided, is used, then the seamed portion thereof will be always kept parallel to the water level, thus similar effect may be obtained.

In this manner, the float is made to serve directly as a valve body, the valve port is provided on upper portion of the side wall of main body, said float is formed by seaming two semi-spherical shells, of which center of gravity is made to lie on the central axis of one of said semi-spherical shells, so that said seamed portion will be always kept parallel to the water level and by no means contact the valve port, accordingly the float is available without finishing the seamed portion.

And, since said valve port is provided on upper portion of the side wall of main body, the vertical component of valve closing force acting on the valve port is much less than in the case of valve port provided on top portion of the main body, thus a valve port having comparatively large aperture can be opened by a small-type float.

Further, in the air vent according to the present invention, the operating rod 8, which serves as a seat for float, is adjustably provided by the cap 10 in vertical direction, so that the production of float seat, which requires high degree of finishing, can be made easy, the time for finishing can be largely saved, the regular position for valve closing of the float 4 can be set at all times, and at the time of starting and the like, by pushing said operating rod 8, the float 4 will be parted from the valve seat 6 and the valve will be forcibly opened, thus a large quantity of air can be exhausted in a short time.

What is claimed is:

1. A float-type air vent, such as used as an air vent valve for cold water, hot water and the like, comprising a valve body, said valve body defining a hollow chamber having an upwardly extending central axis, said valve body having a top portion extending across the upper end of said hollow chamber, an upwardly extending side portion extending downwardly from said top portion and laterally enclosing said hollow chamber, and a bottom portion extending downwardly from said side portion and forming an inlet to said hollow chamber extending about the central axis of said hollow chamber, a float valve housed and guided freely movable within said hollow chamber and prevented from downward displacement therefrom by said bottom portion, a seat member positioned in the upper part of said side portion of said valve body and spaced laterally from the central axis of said hollow chamber, said valve seat member having a connecting passage therethrough communicating between the hollow chamber in said valve body and the exterior of said valve body and the axis of said passage defining an acute angle with the central axis of said hollow chamber, and a valve seat mounted in said valve seat member extending about said connecting passage at the interior surface of said valve body, said float is spherical and comprises two semi-spherical shells secured together along a circumferentially extending seam which extends substantially normally of the upright axis of the hollow chamber and the radius of said float being greater than the dimension along the central axis of said hollow chamber between the inside surface of the top portion of said valve body and the plane extending normally to the central axis and passing through the lowermost point of the inlet to the connecting passage so that the seam of said float body is located in a plane spaced below the lower end of said valve seat, said two semi-spherical shells each having a different thickness with the thicker said shell being located below the thinner said shell so that the center of gravity of said float is located on the central axis of the lower one of said shells below the horizontally extending seam thereof, said top portion having an opening therethrough extending along the central axis of said hollow chamber, an operating rod extending through the opening in said top portion along the central axis of said hollow chamber in such a manner that the lower end of said rod projects into said hollow chamber, and a cap screwed onto the outer surface of said top portion of said valve body and having an opening therein through which the upper end of said operating rod projects upwardly and is arranged so that said cap cooperates with said operating rod and the upper end of said operating rod is exposed exteriorly of said valve body and by adjusting the screw connection of said cap to said top portion of said valve body, the position of the lower end of said operating rod within said hollow chamber can be selectively established for positioning said float at said valve seat for closing off said connecting passage extending through said valve seat member, and the upper end of said operating rod is accessible on the exterior of said valve body for manually displacing said float from said valve seat.

2. A float-type air vent, as set forth in claim 1, wherein a weight is provided on the central axis of one of said semi-spherical shells so that the center of gravity of said float is displaced along the central axis thereof relative to the seam joining said shells.

3. A float-type air vent, as set forth in claim 1, wherein a threaded section is formed on the outer periphery of the lower end of said valve body for connecting an inlet member to the bottom portion thereof, and an annular member fitted into the inner periphery of the lower end of the bottom portion of said valve body for preventing said float from being displaced out of the lower end of said valve body.

4. A float-type air vent, as set forth in claim 1, wherein said valve body comprises an upper main body defining said top and side portions of said valve body and a bottom member connected to and extending downwardly from the lower end of said main body and forming the bottom portion thereof, and said bottom member having a threaded section formed on its outer periphery at the lower end thereof for connecting an inlet member thereto.

5. A float-type air vent, as set forth in claim 1, wherein the O-ring is positioned between and forms a seal between said operating rod and said valve body.

6. A float-type air vent, as set forth in claim 1, wherein a bellows is positioned between and forms a seal between said operating rod and said valve body.

* * * * *